UNITED STATES PATENT OFFICE.

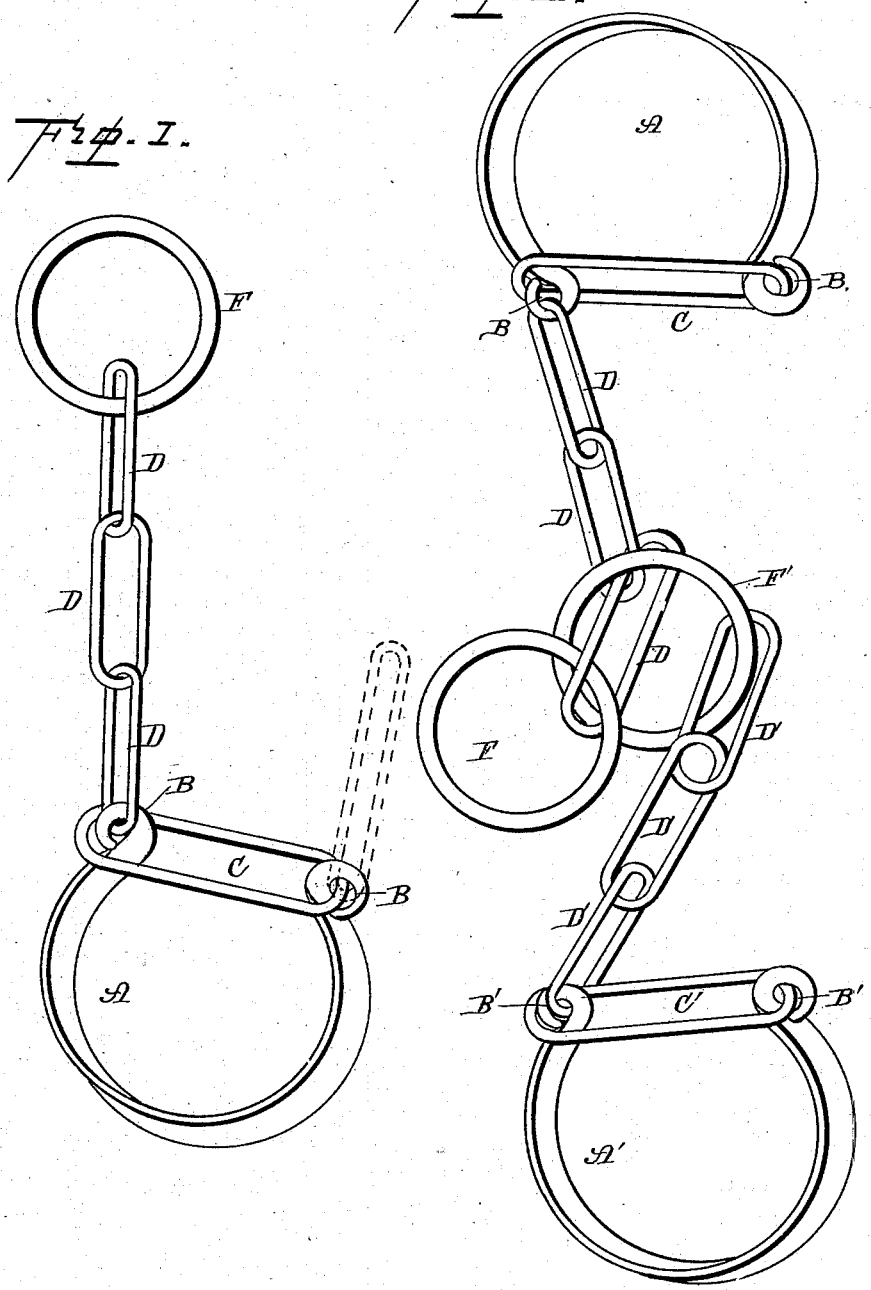

JULIUS O. COTTLE AND RUFUS IVIE, OF ST. JO, TEXAS.

HOPPLE FOR HORSES.

SPECIFICATION forming part of Letters Patent No. 293,312, dated February 12, 1884.

Application filed November 19, 1883. (No model.)

*To all whom it may concern:*

Be it known that we, J. O. COTTLE and R. IVIE, of St. Jo, in the county of Montague and State of Texas, have invented certain new and useful Improvements in Hopples for Horses; and we do hereby declare the following to be a full, clear, and exact description of the invention, such as will enable others skilled in the art to which it pertains to make and use it, reference being had to the accompanying drawings, which form part of this specification.

Our invention relates to an improvement in hopples for horses; and it consists in the combination of two curved or bent pieces which are to go around the horse's ankles, each one of which pieces is provided with a long link, which is loosely connected to one end of the bent piece, and three links and a ring, which are connected to the other end of the bent piece, and which rings, links, and loops are used in fastening the two hopples or curved pieces together after they have been applied to the horse's legs, as will be more fully described hereinafter.

The object of our invention is to provide a chain hopple for horses, and which is made in two separate and distinct parts, and which can be connected together, after they have been applied to the horse's legs, in such a manner as to allow the horse to walk slowly about, permitting him to graze at leisure, and enabling him to be easily caught when desired.

Figure 1 is a plan view of one half of the hopple by itself. Fig. 2 shows the two parts of the hopple connected together so as to allow the horse to walk slowly about.

A A' represent two curved pieces of metal, which are intended to encircle the horse's ankles, and which have their ends separated sufficiently to allow the ankles to be freely inserted. The ends of these bent pieces have the eyes B B' formed upon them for the purpose of attaching the long links C C' and the short links D D' to them. The links C C' are made just long enough to reach over the opposite ends of the pieces A A', and thus close the spaces between the ends, to prevent the hopple from coming off the legs. The links D D' form short chains, and have the rings F F' attached to their outer ends, as shown, for the purpose of fastening the outer ends of the chains together, and thus connecting the two parts of the hopple while upon the horse's legs.

To put the hopple on a horse, slip the piece A upon one ankle, and pass the ring F and the three links D through the long link C upon the opposite end, and then close the link over the opposite end of the piece A, as shown in Fig. 1. This closes this part of the hopple on the ankle, and secures it in position. Then pass the long link C' of the other part, A', the bent part A', and the links D' through the ring F, that has already been secured to the ankle, until the rings F F' come together, as shown in Fig. 2. Then slip the bent piece A' around the opposite ankle, passing its long link C' through the ring F, on the opposite part of the hopple, slipping the ring F' on the other hopple through link C, and letting the link C' slip down to its proper position. The chains serve to bind the feet together, so that one can be advanced in front of the other only a short distance, and thus prevent the horse from running away. To take the hopple off, slip one of the long links C C' through the rings F F' on the opposite part of the hopple, and then pass the ring F of the same side through the link C', which releases the hopple on that side. Then slip off that part of the hopple from that ankle, passing that side on out through the ring on the opposite leg. Then slip the long link on the last leg over the links and ring, which leaves the last side loose, to be taken off. A third piece, like the other two, can be attached to either one of the hind legs, and then fastened to those on the front legs by a snap.

Having thus described our invention, we claim—

A hopple composed of the two bent pieces A A', each one of which is provided with a long link, C C', a short chain, D D', and a ring, F F', substantially as shown.

In testimony whereof we affix our signatures in presence of two witnesses.

JULIUS O. COTTLE.
    RUFUS IVIE.

Witnesses:
 L. S. FREEBORN,
 B. V. WHEELER.